United States Patent [19]

Fink et al.

[11] Patent Number: 5,653,490
[45] Date of Patent: Aug. 5, 1997

[54] SLIDING VISOR

[75] Inventors: Lisa A. Fink, Grand Haven; Stuart Orrell, Holland; Michael R. Yandell, Zeeland; Robert J. Stenman, Fennville; S. John Bentley, Hudsonville, all of Mich.

[73] Assignee: Prince Corporation, Holland, Mich.

[21] Appl. No.: 631,177

[22] Filed: Apr. 12, 1996

[51] Int. Cl.⁶ .................................................. B60J 3/02
[52] U.S. Cl. ........................ 296/97.11; 296/97.12
[58] Field of Search .................... 296/97.11, 97.12, 296/97.8, 97.1, 97.5, 97.9

[56] References Cited

U.S. PATENT DOCUMENTS

| | | |
|---|---|---|
| 2,095,715 | 10/1937 | Rhein . |
| 2,201,348 | 5/1940 | Roberts . |
| 2,201,377 | 5/1940 | Schoenheit . |
| 2,207,668 | 7/1940 | Hudgings, Jr. . |
| 2,221,182 | 11/1940 | Davies . |
| 2,294,317 | 8/1942 | Pelcher et al. . |
| 2,322,898 | 6/1943 | Van Dresser . |
| 3,556,585 | 1/1971 | Binder . |
| 4,521,046 | 6/1985 | Foggini . |
| 4,582,356 | 4/1986 | Kaiser et al. . |
| 4,902,063 | 2/1990 | Crink . |
| 4,921,300 | 5/1990 | Lawassani et al. . |
| 4,925,233 | 5/1990 | Clark . |
| 4,998,765 | 3/1991 | Van Order et al. . |
| 5,026,108 | 6/1991 | Leahy . |
| 5,161,850 | 11/1992 | Redder et al. . |
| 5,409,285 | 4/1995 | Snyder et al. . |

FOREIGN PATENT DOCUMENTS

| | | |
|---|---|---|
| 3235997 | 3/1984 | Germany . |
| 3324305 | 1/1985 | Germany . |
| 5286363 | 11/1993 | Japan . |
| 2088299 | 6/1982 | United Kingdom . |
| 0231440 | 8/1987 | United Kingdom . |

*Primary Examiner*—Joseph D. Pape
*Attorney, Agent, or Firm*—Price, Heneveld, Cooper, DeWitt & Litton

[57] ABSTRACT

A visor includes a guide channel which receives an elongated pivot rod and combined torque control and slide. The slide comprises a lubricous polymeric member which surrounds the torque control to present a sliding interface between the visor rod and channel within the visor body while the torque control allows the visor to be raised to desired adjusted positions between a raised storage position adjacent the vehicle roof and lowered use positions. In one embodiment, at least one bias spring extends between the slide and channel for providing the desired sliding action and permitting tolerance variations in the manufacture of the visor control.

27 Claims, 3 Drawing Sheets

SLIDING VISOR

BACKGROUND OF THE INVENTION

The present invention relates to vehicle visors and particularly to a visor which is adjustable along its longitudinal axis.

There exists a variety of visors which can provide front and side window protection against incident sunlight. A multiple visor panel installation, for example, can be employed by which simultaneous windshield and side window protection is afforded as disclosed in U.S. Pat. No. 4,681,363. Conventional single visor installations typically provide a visor which can be pivoted from the windshield position to the side window position but are not normally otherwise adjustable along the axis of the visor pivot rod. To provide such adjustability, several sliding visors have been developed, including those disclosed in U.S. Pat. Nos. 4,925,233, 4,998,765 and 5,161,850. The latter two of these patents disclose auxiliary visors which are fixed along the front windshield but which slide along their longitudinal axis. The '233 patent provides front and side window protection with a sliding visor having a body molded of a polymeric material and which includes means for guiding the visor movement along its pivot rod including guide rods. Although this visor provides the desired additional sun-blocking protection by allowing the visor to move along the longitudinal axis of the pivot rod to which it is mounted, with the somewhat heavy polymeric core construction, the additional guide means somewhat complicates and increases the cost of the structure. In order to provide a less costly, easy to manufacture visor of light weight construction, the improved sliding visor construction of the present invention has been developed.

SUMMARY OF THE PRESENT INVENTION

The visor system of the present invention provides a unique visor control and visor in which a visor includes a guide channel which receives an elongated pivot rod and combined torque control and slide having a unique construction which permits the visor panel to slide with respect to the pivot rod and torque control and slide mounted thereto. The slide comprises a lubricous polymeric member which extends around the torque control to present a sliding interface between the visor rod and visor body while the torque control allows the visor to be moved to desired adjusted positions between a raised stored position adjacent the vehicle roof and lowered use positions.

In a preferred embodiment of the invention, at least one bias spring extends between the slide and channel for providing the desired sliding action and permits tolerance variations in the manufacture of the visor control. With such a visor, therefore, an improved inexpensive sliding visor construction is provided which allows the use of a lightweight core material and provides a slidably adjustable visor for improved sun-blocking efficiency. These and other features, objects and advantages of the present invention will become apparent upon reading the following description thereof together with reference to the accompanying drawings.

DETAILED DESCRIPTION OF THE PREFERRED EMBODIMENT

Figure 1:
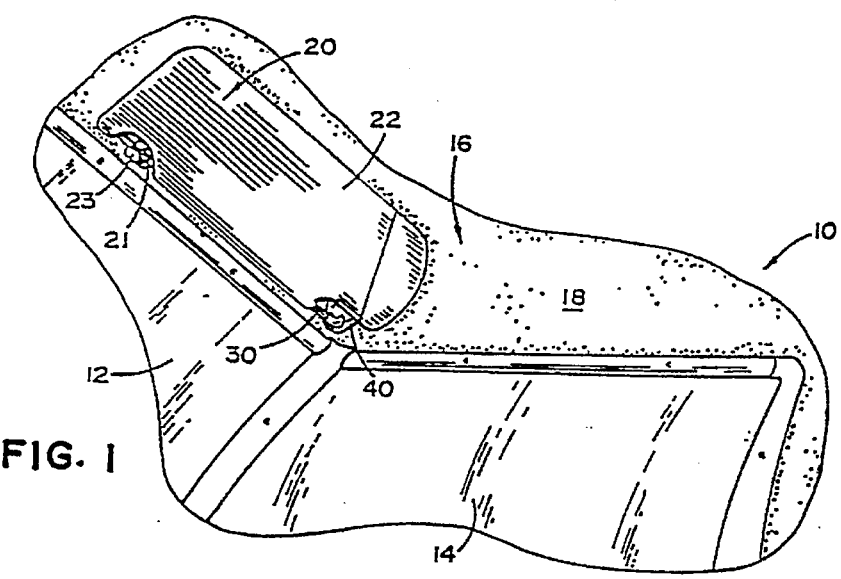
FIG. 1 is a fragmentary perspective view of a vehicle including a visor embodying the present invention shown in a raised, stored position against the vehicle headliner.
Figure 2:
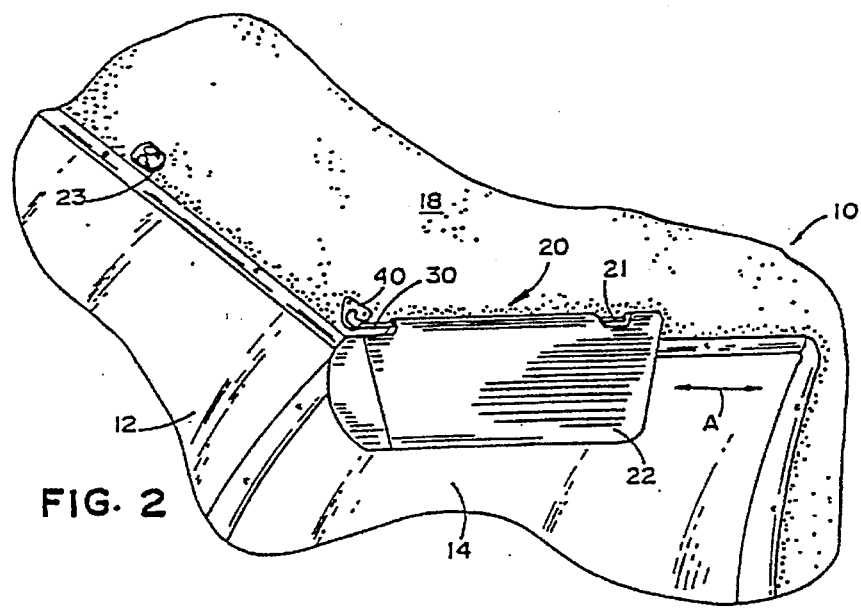
FIG. 2 is a fragmentary perspective view of the visor shown in FIG. 1, shown in a lowered first side window use position.
Figure 3:
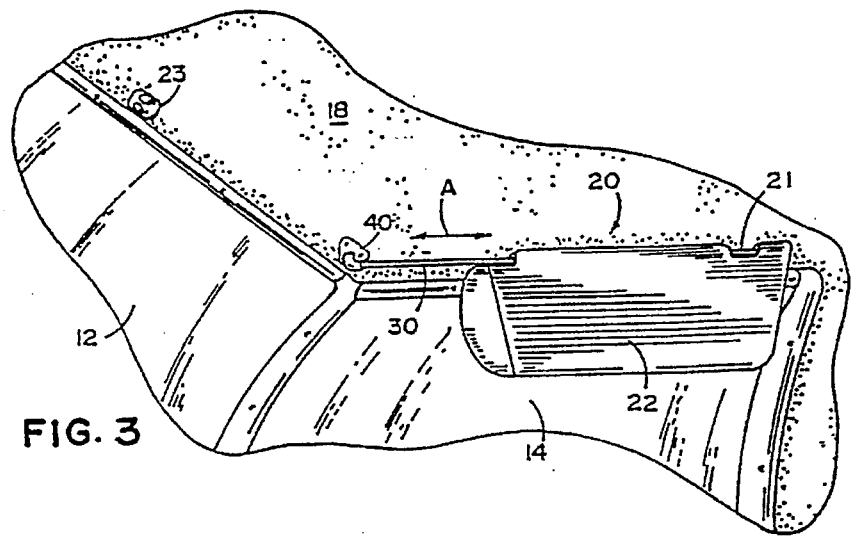
FIG. 3 is a fragmentary perspective view of the visor shown in FIG. 2, shown in a second use position, adjusted with respect to the visor rod.

Referring initially to FIGS. 1–3, there is shown a vehicle 10 having a windshield 12, passenger right side window 14 and a roof 16, typically covered with a preformed headliner 18. Mounted to the passenger side of the vehicle, as shown in the fragmentary perspective view of these figures, is a visor assembly 20 which includes a visor 22 having an upholstered, folded, butterfly-shaped core, as described in greater detail below. The visor 22 is pivotally and slidably mounted to a pivot rod 30 which, in turn, is mounted to a conventional elbow mounting bracket 40. The elbow bracket 40 permits the visor rod 30 and visor slidably mounted thereon to be pivoted from the front windshield position, as illustrated in FIG. 1, to the side window position, as illustrated in FIGS. 2–3, in a conventional manner. The visor includes a secondary visor clip 21 which snap-fits within a socket 23 mounted to the roof of the vehicle in spaced relationship to bracket 40 for supporting the visor in the stored position illustrated in FIG. 1. A similar visor (not shown) is mounted to the driver's side of the vehicle.

The visor 22 can be moved along the visor rod 30 along its longitudinal axis as illustrated by arrow A in FIGS. 2 and 3 for providing adjustment of the visor along the side window (or windshield once released from socket 23) for optimum sun-blocking convenience. The visor is mounted to the pivot rod 30 by an improved visor control assembly 50 as illustrated in FIGS. 4–8, which not only permits the visor to slidably move along the visor rod, but also permits the snap-up assisted storage of the visor in the position shown in FIG. 1, as well as holding the visor in any desired lowered selected use position pivoted about rod 30 or slidably adjusted, therealong. The construction of the visor control to accomplish this is best seen by reference to FIGS. 4–8, now described.

Figure 4:
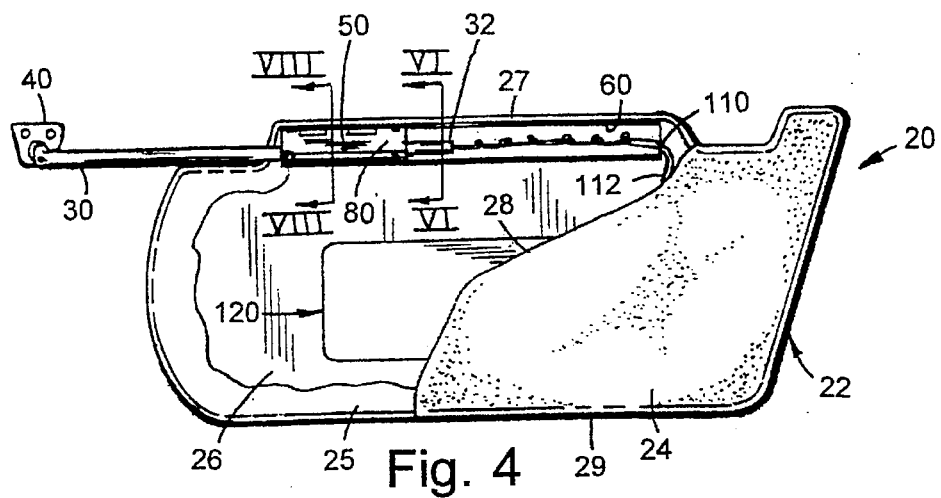
FIG. 4 is a front elevational view of the visor shown in FIG. 3, shown partly broken away to illustrate the visor control mechanism.

The visor 22 is made from a relatively thin fiberboard die cut in the shape of a butterfly with an upholstery material 24 surrounding its outer surface and folded over the edges as shown at 25 (FIG. 4). The butterfly-shaped core integrally includes panels 26 and 28 which are folded along edge 27 and suitably bonded along the mating peripheral edges 29 after the insertion of the visor control 50 of the present invention. This core construction and its upholstering can be of the type disclosed in greater detail in U.S. Pat. No. 5,161,850, the disclosure of which is incorporated herein by reference.

Figure 6:
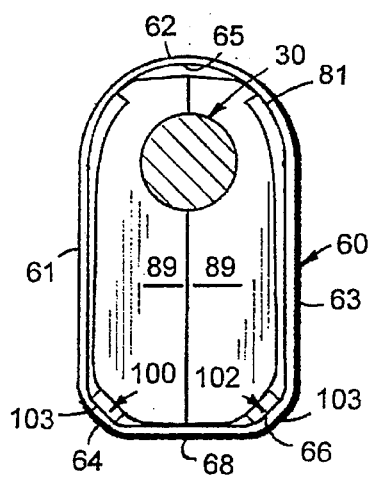
FIG. 6 is an enlarged cross-sectional view taken along section line VI—VI of FIG. 4.
Figure 7:
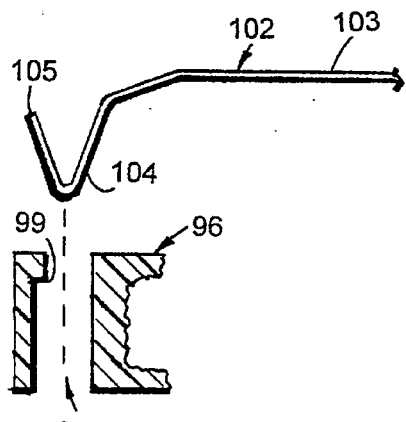
FIG. 7 is a greatly enlarged exploded fragmentary perspective view showing the mounting of one of the bias springs to the slide shown in FIGS. 5 and 6.
Figure 8:
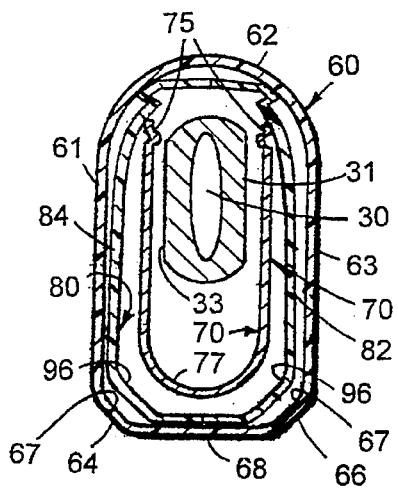
FIG. 8 is an enlarged cross-sectional view taken along section line VIII—VIII of FIG. 4.
Figure 5:
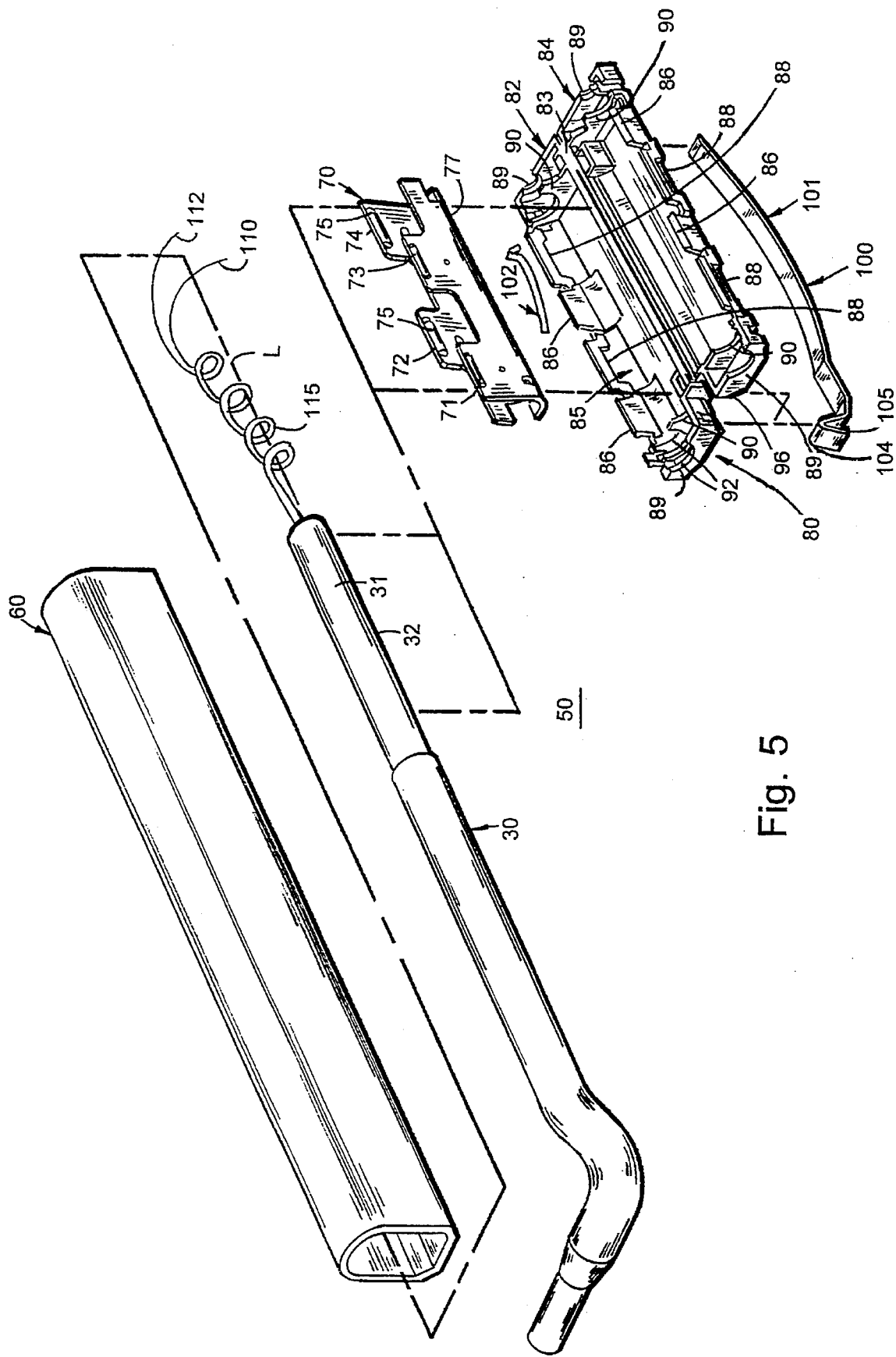
FIG. 5 is an enlarged fragmentary exploded perspective view of the visor control shown also in FIG. 4.

The visor control 50 of the present invention includes, as seen in FIGS. 4 and 5, a tubular guide channel 60 which can be made of extruded aluminum, a torque control 70 surrounded by a lubricous polymeric slide 80 to which a pair of guide springs 100 and 102 are attached. The combination of the slide 80, torque control 70 and bias springs 90 and 92 fit over the end 32 of pivot rod 30, and the combination is then slidably placed within guide 60, which is anchored by an adhesive within the folded edge 27 of the visor 22. Guide 60, as best seen in FIGS. 6 and 8, comprises a generally elongated, somewhat oval cross section member having a rounded upper end 62 conforming generally to the curved upper edge 27 of visor 22. The guide includes downwardly depending, spaced parallel sides 61 and 63 which extend inwardly at lower corners 64 and 66 at an angle of approximately 45° and integrally communicate with floor 68. The inner surfaces 67 of corners 64 and 66 provide a contact surface for the outwardly bowed center section 103 of each of the bias springs 100 and 102 and, specifically, the outer surfaces thereof as schematically illustrated in FIG. 6.

As best seen in FIG. 8, the hollow pivot rod 30 includes a pair of flat sides 31, 33, which are engaged by alternately staggered legs 71–74 (FIG. 5) of a torque control 70 made of a suitable spring steel and having a generally U-shaped construction. The top inner edges of legs 71–74 include inwardly extending projections 75 which extend over the top of the visor rod 30, as best seen in FIG. 8, for holding the torque control 70 in position over the visor rod. The legs 71–74 are integral with the curved floor 77 of U-shaped clip 70.

The torque control 70 is encapsulated within the slide 80 which comprises a member integrally molded of a lubricous polymeric material such as polypropylene. Slide 80 includes a first side 82 and a second side 84 integrally joined along an integrally molded hinge 83 such that the two sides can be folded together over the torque control 70, which fits within the central cavity 85 formed in the slide 80. Each of the halves 82 and 84 include mating locking tabs 86 and correspondingly aligned locking slots 88 for snap-locking the sides together surrounding and encapsulating the torque clip 70 within the central cavity 85. Slide 80 includes double spaced end walls 89 and 90 on each of the sides 82, 84, with each of the spaced end walls including semicylindrical cradles 92 which surround the curved ends of the pivot rod 30 for holding the torque control and slide 80 securely to the pivot rod. Each of the sides 82, 84 include corners 96 angled at approximately 45° to conform to the angles 64, 66 within guide 60 (FIG. 8) and a snap-in receiving slot 98 (FIG. 7) for lockably receiving the V-shaped end 104 of each of the biasing springs 100 and 102. Slot 98 includes a lip or tab 99 which lockably engages a tip 105 of the bias spring once fully inserted into the slot formed in the body in the angled portion 96 of each of the sides 82, 84 of slide 80.

The crowned outer surfaces 103 of the bias springs 100, 102 thus ride along the inner surfaces 67 of guide 60 to take up any space and, therefore, prevent rattling of the visor slide 80 within the guide 60 and assure the smooth sliding operation of the visor 22 along pivot rod 30 and hold its adjusted position. The visor control 50 includes a pair of conductors 110, 112 (FIGS. 4 and 5) extending through the hollow pivot rod 30 and guide 60. The conductors are coupled to an illuminated vanity mirror assembly 120 (FIG. 4) of a construction generally the same as that disclosed in U.S. Pat. No. 5,428,513, the disclosure of which is incorporated herein by reference. For such purpose, the conductors 110, 112 will include a coiled section 115 to allow the conductors to remain in engagement with the illuminated vanity mirror package 120 as the visor 22 slides along the pivot rod. These conductors conventionally extend through bracket 40 and are coupled to the vehicle's power supply.

The slide 80 presents a lubricous polymeric outer surface 81 (FIGS. 6 and 8) which generally conforms to the inner surface 65 of guide 60 with suitable clearance for easy sliding of the lubricous slide 80 therein. In order to provide sufficient clearance, the bias springs 100 and 102 mounted in the angled corners of the slide 80 and engaging the inner angled surfaces of the guide 60 are provided. If desired, the spring steel bias springs 100, 102 may have their outer contacting surface 103 coated with a lubricant such as a silicon grease if necessary when the guide 60 is made of an extruded aluminum. Guide 60 may, however, be made of an extruded lubricous polymeric material as well and, in such case, a lubricant is not necessary. By encapsulating the torque control 70 with slide 80, it is isolated from the guide 60 and is securely anchored to the pivot rod. The slide 80 with the bias springs 100, 102 assures the relatively smooth sliding operation of the visor along the longitudinal axis L (FIG. 5) of the pivot rod 30 and assists in holding the visor in a desired adjusted position along the longitudinal axis of the elongated pivot rod 30. Thus, the bias springs serve the dual function of providing manufacturing dimensional tolerances and also assist in holding the visor in a desired selected adjusted position. With such construction, therefore, a visor having a relatively light weight construction can be provided utilizing a slide of integrally molded or stamped members which can be snap-fitted together to complete the assembly.

It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A vehicle visor comprising:
   a visor body including a guide channel formed therein adjacent one edge of said visor body;
   a visor pivot rod and means for mounting said pivot rod to a vehicle for movement of said visor body attached to said pivot rod between a forward windshield position and a side window position; and
   a pivot rod control mounted to said pivot rod in a fixed longitudinal position with respect to said pivot rod, said control positioned within said guide channel for slidable movement therealong to permit said visor body to slide longitudinally along the axis of said pivot rod, said pivot rod control rotatable about said pivot rod,to hold said visor in selected adjusted positions, wherein said control includes a torque control extending over said pivot rod and a slide extending over said torque control for providing a lubricous interface between said pivot rod control and said guide channel and wherein said slide substantially surrounds said torque control.

2. The visor as defined in claim 1 wherein said slide includes at least one bias spring mounted thereto and extending outwardly therefrom for engaging said guide channel for urging said pivot rod control into engagement with said guide channel.

3. The visor as defined in claim 2 wherein slide includes a pair of bias springs extending outwardly therefrom for engaging opposite corners of said guide channel.

4. The visor as defined in claim 3 wherein said bias springs extend at an angle of approximately 45° from corners of said slide.

5. The visor as defined in claim 4 wherein said slide comprises molded polymeric sides integrally joined by a hinge, said sides defining a central cavity for receiving said torque control when folded to circumscribe said torque control.

6. The visor as defined in claim 5 wherein said sides of said slide include tabs and mounting slots for snap-locking said sides together.

7. The visor as defined in claim 6 wherein said slide includes slot means for lockably receiving said bias springs.

8. The visor as defined in claim 7 wherein said slot means includes tab means for lockably holding an end of a bias spring inserted into said slot means.

9. The visor as defined in claim 8 wherein said end of said bias spring is V-shaped.

10. A visor control for use in a visor having a guide channel for receiving the visor control, said visor control comprising:

a visor pivot rod;

a generally U-shaped torque control extending over said pivot rod; and a lubricous polymeric slide encapsulating said torque control for providing a sliding interface between said pivot rod and the guide channel of said visor mounted thereto.

11. The visor control as defined in claim 10 and further including a guide channel adapted to be mounted with said visor, said guide channel receiving said slide for sliding movement within said channel.

12. The visor control as defined in claim 11 wherein said slide includes at least one bias spring mounted thereto and extending outwardly therefrom for engaging said guide channel for urging said pivot rod control into engagement with said guide channel.

13. The visor control as defined in claim 12 wherein said slide includes a pair of bias springs extending outwardly therefrom for engaging opposite corners of said guide channel.

14. The visor control as defined in claim 13 wherein said bias springs extend at an angle of approximately 45° from corners of said slide.

15. The visor control as defined in claim 14 wherein said slide comprises molded polymeric sides integrally joined by a hinge, said sides defining a central cavity for receiving said torque control when folded to circumscribe said torque control.

16. The visor control as defined in claim 15 wherein said sides of said slide include tabs and mounting slots for snap-locking said sides together.

17. The visor control as defined in claim 16 wherein said slide includes slot means for lockably receiving said bias springs.

18. The visor control as defined in claim 17 wherein said slot means includes tab means for lockably holding an end of a bias spring inserted into said slot means.

19. The visor control as defined in claim 18 wherein said end of said bias spring is V-shaped.

20. A vehicle visor comprising:

a visor body;

a guide channel mounted adjacent one edge of said visor body;

a visor pivot rod and means for mounting said pivot rod to a vehicle for movement of said visor body attached to said pivot rod between a forward windshield position and a side window position; and a pivot rod control mounted to said pivot rod in a fixed longitudinal position with respect to said pivot rod, said control positioned within said guide channel for slidable movement therealong to permit said visor body to slide longitudinally along the axis of said pivot rod, said pivot rod control rotatable about said pivot rod to hold said visor in selected adjusted positions, wherein said control includes a torque control extending over said pivot rod and a lubricous polymeric slide encapsulating said torque control for providing a lubricous interface between said pivot rod control and said guide channel.

21. The visor as defined in claim 20 wherein said slide comprises molded polymeric sides integrally joined by a hinge, said sides defining a central cavity for receiving said torque control when folded to circumscribe said torque control.

22. The visor as defined in claim 21 wherein said sides of said slide include tabs and mounting slots for snap-locking said sides together.

23. The visor as defined in claim 21 wherein said slide includes at least one bias spring mounted thereto and extending outwardly therefrom for engaging said guide channel for urging said pivot rod control into engagement with said guide channel.

24. The visor as defined in claim 23 wherein said slide includes slot means for lockably receiving said bias spring.

25. The visor as defined in claim 24 wherein said slot means includes tab means for lockably holding an end of a bias spring inserted into said slot means.

26. The visor as defined in claim 25 wherein said end of said bias spring is V-shaped.

27. The visor as defined in claim 23 wherein said slide includes a pair of bias springs extending outwardly therefrom for engaging opposite corners of said guide channel.

* * * * *

UNITED STATES PATENT AND TRADEMARK OFFICE
CERTIFICATE OF CORRECTION

PATENT NO. : 5,653,490

DATED : August 5, 1997

INVENTOR(S) : Lisa A. Fink et al

It is certified that error appears in the above-identified patent and that said Letters Patent is hereby corrected as shown below:

On the title page: Item [56]

under Foriegn Patent Documents;

"0231440 8/1987 United Kingdom" should be --0231440 8/1997 European Patent Office--.

Column 3, line 3;

"90 and 92" should be --100 and 102--.

Column 3, line 12;

"comers" should be --corners--.

Column 3, line 62;

before "conductors" delete --,--.

UNITED STATES PATENT AND TRADEMARK OFFICE
CERTIFICATE OF CORRECTION

PATENT NO. : 5,653,490
DATED : August 5, 1997
INVENTOR(S) : Lisa A. Fink et al.

It is certified that error appears in the above-identified patent and that said Letters Patent is hereby corrected as shown below:

Column 4, line 46;

after "rod" (second occurence) delete --,--.

Column 4, line 58;

after "wherein" insert --said--.

Column 4, line 60;

"comers" should be --corners--.

Column 5, line 19;

"said" should be --a--.

Column 5, line 22;

"said visor" should be --a visor--.

Signed and Sealed this

Third Day of February, 1998

*Attest:*

BRUCE LEHMAN

*Attesting Officer*  *Commissioner of Patents and Trademarks*